United States Patent [19]

Cattani

[11] Patent Number: 4,648,829
[45] Date of Patent: Mar. 10, 1987

[54] DEVICE FOR SHAPING ICE CREAMS AND FOOD ARTICLES OF CREAMY CONSISTENCY

[75] Inventor: Luciano Cattani, Milan, Italy

[73] Assignee: Sauer, S.p.A., San Giuliano Milanese, Italy

[21] Appl. No.: 695,856

[22] Filed: Jan. 28, 1985

[30] Foreign Application Priority Data

Feb. 13, 1984 [IT] Italy ............................... 19593 A/84
Feb. 13, 1984 [IT] Italy ............................... 19594 A/84

[51] Int. Cl.⁴ .......................... A23P 1/00; A23G 9/04
[52] U.S. Cl. ................... 425/326.1; 264/294; 264/335; 264/500; 425/405 R; 425/437; 425/126 S; 426/515
[58] Field of Search ............... 425/326.1, 405 R, 437, 425/121, 126 S; 264/335, 500, 294; 426/515

[56] References Cited

U.S. PATENT DOCUMENTS 2,733,493 2/1956 Bryer ..................................... 264/335

FOREIGN PATENT DOCUMENTS 2078155A 1/1982 United Kingdom ................ 425/437

*Primary Examiner*—George Yeung
*Attorney, Agent, or Firm*—Browdy and Neimark

[57] ABSTRACT

A device for shaping ice cream into shaped articles, comprising extruder members (2) to deliver an ice-cream blank (3), cutter members (10) to subdivide the blank into a plurality of slugs (13) and conveyor for transporting the slugs (13) while being carried by trays (9) to a molding device (1). The molding device (1), which shapes the slugs of ice cream on the trays, comprises operative members (22, 23) to supply compressed air and at least one forming unit (15). The forming unit (15) includes an air pervious contoured die (16), formed by a porous material with a substantially uniform thickness, drive elements (19) for moving the die (16) toward the slugs of ice cream to be shaped, and walls defining an internal chamber (18) supplied by compressed air by the operative members (22, 23) and in communication with the die (16), to realize a uniform distribution of compressed air and a thin gap of air between the total surface of the shaped article and the surface of the die (16) facing the shaped article.

3 Claims, 12 Drawing Figures

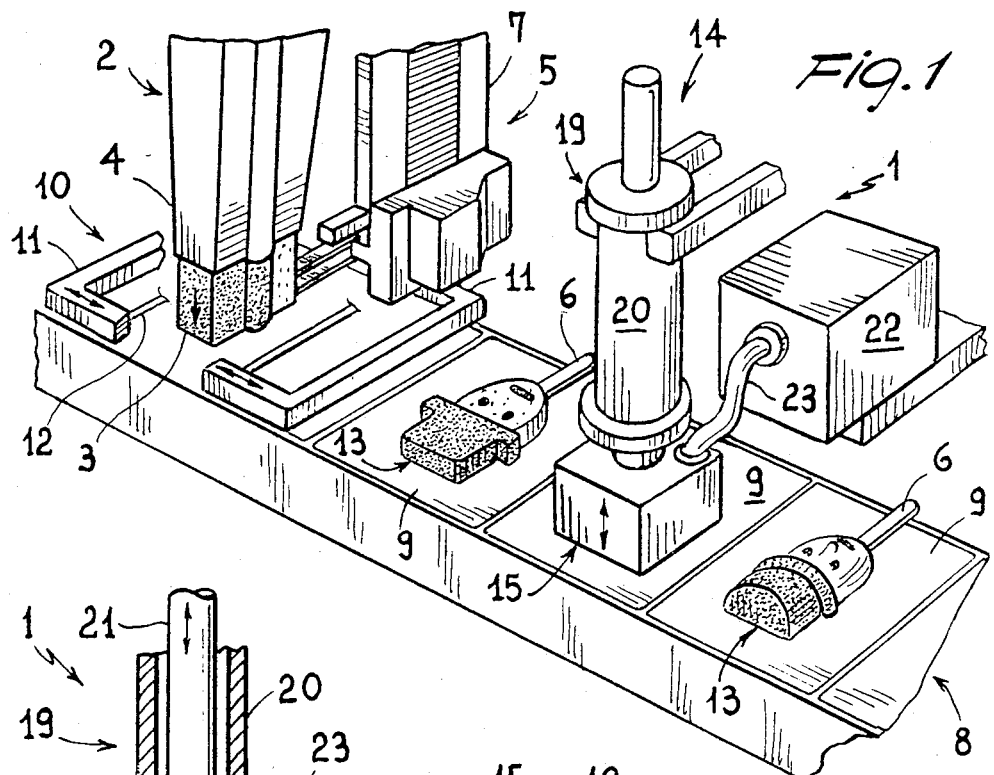

4,648,829

DEVICE FOR SHAPING ICE CREAMS AND FOOD ARTICLES OF CREAMY CONSISTENCY

BACKGROUND OF THE INVENTION

This invention relates to a device for shaping ice creams and food articles, such as "semifreddo", of a thick and creamy nature.

As is known, there exist many products in the food processing field the valuability whereof is also dependent on the their shapes. Typical is the instance of ice creams, such as ice creams fitted with a stick or popsicles, wherein shape is often a determining factor in prompting the consumer's preference.

The possibility of shaping or fashioning in a quick and accurate way the cited products, after the same have been substantially finished as regards volume and physical state, are currently quite limited. In particular, impossible are operations seemingly quite simple and quick to carry out, such as the operations of molding from the outside by pressing with dies reproducing a desired shape. This is mainly due to the fact that application of a die would result in the die becoming naturally stuck. Such sticking of the die, on the one side, hinders the flowing movements of the material being processed, and on the other side, results in partial destruction of an accomplished shape on raising the die. In some instances, where adherence is specially strong, the die raising results in the processed article being raised with it.

The shaping operations, as carried out on the cited articles with the same in a substantially completed state, are not only important to the conferment of particular outward shapes thereon, but also to the achievement of particular "structural" features thereof. In fact, it may be necessary to provide pockets, recesses, grooves and the like whereinto some particular components in addition to those forming the body of the article may be seated.

Such outside operations are impracticable if dies or templates are used which operate from the outside and by deforming the articles in question.

SUMMARY OF THE INVENTION

It is a technical aim of this invention to provide a device which afford the possibility of performing shaping operations which are simple, fast, and of low cost, even where said articles have a volume and a physical consistency which approximate their final ones:

The above aim is substantially achieved by a device which is characterized in that it comprises at least one forming unit including an air-pervious contoured die and drive elements for moving said die, and members operative to supply compressed air to said die from the opposite side thereof to that engageable with articles to be shaped.

BRIEF DESCRIPTION OF THE DRAWINGS

Further features and advantages of the invention will be apparent from the following description of some preferred embodiments of a device for shaping ice creams, with reference to the accompanying illustrative drawings, where:

FIG. 1 shows in perspective and in simplified form one portion of a system for the production of ice creams fitted with sticks incorporating the device of this invention;

FIG. 2 shows in cross-section the device of this invention, at an isolated position;

FIG. 3 shows one portion of the element of FIG. 2, in an enlarged scale;

FIGS. 4 to 6 illustrate diagramatically the operation of the device of FIG. 2, with the provision of dimpled shaped trays;

DESCRIPTION OF THE PREFERRED EMBODIMENTS

Figure 7:
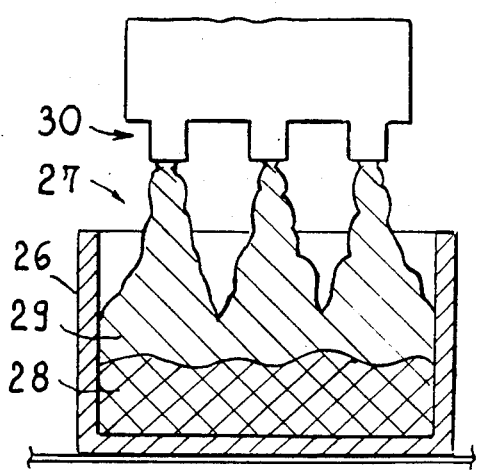
FIGS. 7, 8 and 9 depict the method and device of this invention as applied to a creamy product in the form of a layered "semifreddo"

With reference to FIG. 1, a device according to the invention is shown incorporated to a system for the production of ice creams fitted with a stick, or popsicles. The system comprises extruder members 2 adapted to supply a continuous blank 3 of ice cream. Upstream of the extruder members 2, there are located all of the items of equipment required to form the material making up the blank 3. The equipment is of conventional design. Preferably, the blank 3 would be of the composite type, and accordingly, the extruder members 2 provide for co-extrusion by gathering and delivering several ingredients in parallel relationship which have different colors and tastes. Furthermore, as shown in FIG. 1, the extruder members 2 have an extrusion orifice 4 which is contoured to impart the blank 3 with a particular shape, related to the components being co-extruded, so as to provide a given pattern. In the example shown, the extrusion orifice 4 and the various components of the blank 3 are arranged to provide the pattern of a face surmounted by a hat.

Located adjacent the extruder members 2 is a unit 5 operative to automatically drive sticks 6 into the blank 3. The sticks 6 are picked up from a stack 7 of sticks.

The blank 3 issues from the extrusion orifice 4 from top to bottom toward transporting members 8 which convey a plurality of mutually aligned trays 9. The transporting members 8 take the trays 9 along a closed path going through a refrigerating tunnel, not shown and known per se.

Provided between the extrusion orifice 4 and transporting members 8 are cutter members 10 including a pair of bails 11 holding a pair of cutting wires 12 stretched which confront the blank 3. The bails 11 are driven of reciprocating movements to and away from each other which are related to the rate of formation of the blank 3. In practice, each tray 9 will receive one or more slugs 13, in a flattened state, as they flow from the extrusion orifice 4 and past the cutter members 10. Downstream of the latter is, according to the invention, a molding station comprising the device 1 of this invention, which operate mechanically on the slugs 13 to fashion them.

The device 1, shown at an isolated position in FIG. 2, comprises a forming unit 15 having a contoured die 16 which is pervious to air. The die 16 is a porous metal material construction and is preferably in the form of a sintered metal material filter having the shape to be imparted to the slugs 13. The die 16 is held in a supporting element 17 of box-like construction, wherewith it defines a chamber 18. The supporting element 17 is engaged by drive elements 19 controlling the movements of the die 16 and including a fluid-operated cylinder 20 the piston rod 21 whereof is rigid with the supporting element 17.

The device 1 comprises operative members 22 effective to supply compressed air (FIG. 1) and being connected through a flexible hose 23 to the supporting element 17, the hose 23 reaching the chamber 18 through said supporting element.

The device 1 acts on the slugs 13 in a downward direction, and in FIGS. 1 and 2 is shown to act against substantially flat trays 9. Shown in FIGS. 4 to 6 are instead trays 9 formed with a contoured depression 24 wherein the ice creams would be prearranged. FIGS. 5 and 6 also show that the action of the die 16 may be related to a pair of containment side members 25 driven of reciprocating movements directed perpendicularly to the trays 9. The containment side members 25 would be provided where the action of the die 16 is to be particularly powerful or where the same does not fully engage the side areas of the ice creams to be shaped.

Figure 8:
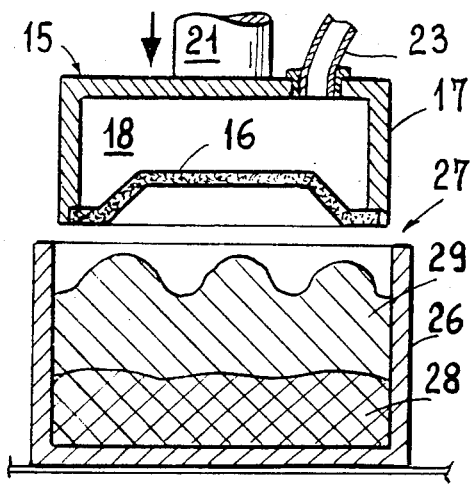
Figure 10:
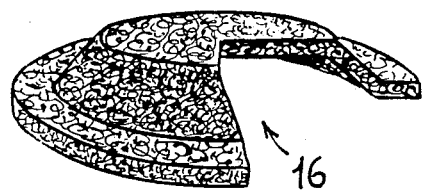
FIG. 10 shows, partly in cut-away view and in perspective, the die of this invention as used with the device of FIGS. 8 and 9.
Figure 9:
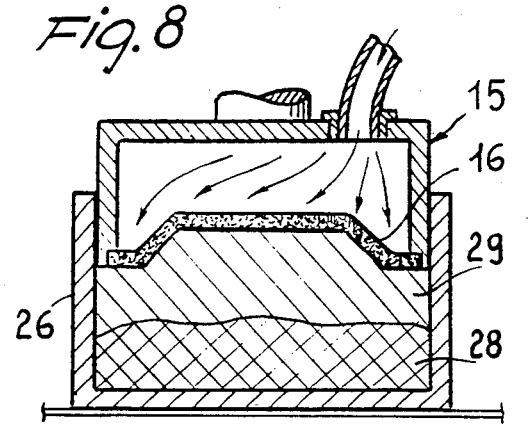

In FIGS. 8 and 9, the device 1 is shown acting inside an open case 26 to shape, for example, a cake contained in the case 26 and having a bottom layer 28 which is relatively hard and an upper layer 29 which is creamy and delivered mechanically from nozzles 30 (FIG. 7).

Figure 11:
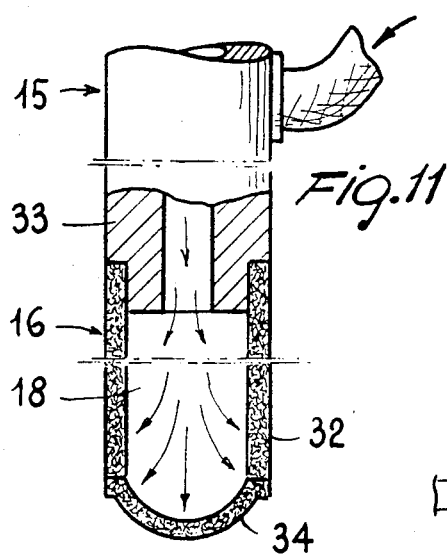
FIGS. 11 and 12 show the construction and application procedure of a device according to the invention as configured to provide a plunger.
Figure 12:
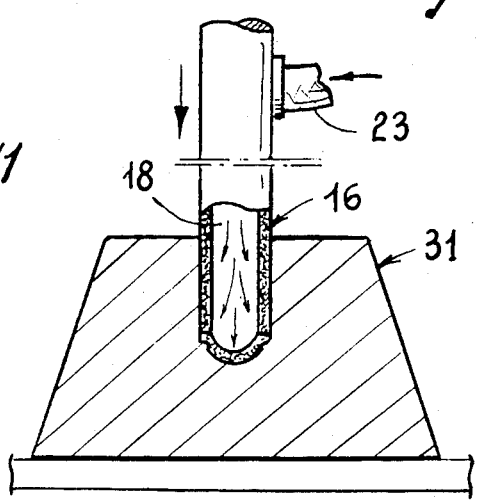

Finally, in FIGS. 11 and 12, the device of this invention, while being constructionally identical to that of the previous figures, is adapted for forming holes, channels, pockets, and the like in articles 31. In particular, it is contemplated that the die 16 may be substantially configured as a punch or plunger. In fact, it comprises, in the example shown in FIGS. 11 and 12, two elements: a cylindrical band 32 which engages with an engagement element 33, and an end cap 34 of rounded shape and being welded to the cylindrical band 32. The engagement element 33 may also be provided by an end portion of the cited rod 21.

It should be also noted that the compressed air supplied from the operative members 22, comprising in practice either a compressor or connection to a compressed air network, preferably has an overpressure of about one atmosphere, and that higher or lower pressures should be selected according to the consistency of the article being processed.

Furthermore, with the die 16 being formed filter from a sintered metal material, the die pore size would preferably be of about 50 microns.

The device of this invention operates as follows.

With reference to FIGS. 1 to 3, the device acts on the slugs 13, as substantially flattened and formed by extrusion followed by cutting. The slugs 13 are taken by the transporting members 8 to the device 1, where they are deformed by the action of the die 16 which is pushed toward the trays 9 by the fluid-operated cylinder 20. FIG. 2 shows that, while the die 16 engages with the slugs 13 from above, pressurized air is introduced into the chamber 18 as supplied from the members 22 and conveyed through the hose 23.

The air pressure delivered into the chamber 18 is such as to allow the air to flow through the die 16 but not such as to damage the underlying ice cream.

Operation of the die 16 results in patterning or shaping that face of the slug 13 which confronts the die, as well as, where the trays 9 are dimpled at the middle (FIGS. 4, 5, 6), patterning or shaping that face of the slug 13 which confronts its respective tray 9.

Depending on requirements, the die 16 may be bottomed out onto each slug 13, to contact the trays 9, or alternatively, may apply a more limited action. In the latter case, it may be necessary to provide the containment side members 25 (FIGS. 5 and 6) which prevent the slug 13 under pressure from collapsing at the sides.

With reference now to FIGS. 7 to 9, it may be seen that the device 1 may also act by entering a case 27 wherein an article to be shaped would be located.

FIGS. 11 and 12 show that the device may also act in a quite independent fashion of the elements which support or contain the articles to be shaped, where highly localized deformations are anticipated.

Blowing air through the die is effective to prevent the die from sticking to the article being processed, even though the latter may have a weak consistency and adhere on contact; air will prevent the article material from entering the die pores. Furthermore, the compressed air will prevent the die from behaving as a suction cup on raising it back. The air blown in also forms a thin gap between the die and article being processed, and this gap will favor the flowing movements of material through the article. Thus, it becomes possible to provide extensive deformations or deep recesses without damaging the article on account of irregular flows or entrainment of the material. Where the shaping step described above is carried out with ice cream defined by a plurality of co-extruded components, shaping may be advantageously arranged to differentiate the thicknesses of said components in the ice cream, so as to enhance their presence. Thus, it is possible to produce in a most simple way ice creams in specially attractive and peculiar shapes.

The device of this invention not only is highly efficient and accurate, but also simple and easy to implement at a low cost. In particular, the die 16 is formed from an inexpensive material which can be readily organized in a large variety of forms.

I claim:

1. A device for shaping ice cream into shaped articles, comprising a combination with extruder members (2) to deliver an ice-cream blank (3), cutter members (10) to subdivide said blank (3) into a plurality of slugs (13), and means for transporting said slugs (13) while being carried by trays (9) to a molding device (1), said molding device (1) shaping said slugs of ice cream on said trays (9) and comprising operative members (22, 23) to supply compressed air, and at least one forming unit (15), said forming unit (15) including an air pervious contoured die (16) having an ice cream facing surface and an opposite surface and formed by a uniformly porous material with a substantially uniform thickness, drive elements (19) for moving said die (16) toward the slugs of ice cream to be shaped, and means defining an internal chamber (18) supplied by compressed air by said operative members (22, 23) and in communication with said opposite surface of said die (16) to realize a uniform distribution of compressed air and a thin gap of air between the total surface of said shaped article and the ice cream facing surface of said die (16).

2. A device according to claim 1 wherein each said tray (9) is formed with a contoured depression (24) to receive one of said slugs (13) from said extruder members (2), and wherein said device (1) acts toward said contoured depression (24) to shape two opposite faces of an ice cream slug to provide a three-dimensional pattern.

3. A device according to claim 1, wherein said means defining an internal chamber (18) comprises a supporting element (17) of a box construction which engages the exterior surface of said die.

* * * * *